United States Patent [19]
Kreis et al.

[11] Patent Number: 5,501,079
[45] Date of Patent: Mar. 26, 1996

[54] APPARATUS AND PROCESS FOR CRYOGENIC SEPARATION OF AIR AND LIQUID DISTRIBUTOR FOR A MASS TRANSFER COLUMN

[75] Inventors: Helmut Kreis, München; Anton Moll, Raisting; Karl H. Stiegler, Neuötting, all of Germany

[73] Assignee: Linde Aktiengesellschaft, Wiesbaden, Germany

[21] Appl. No.: 185,066

[22] Filed: Jan. 24, 1994

[30] Foreign Application Priority Data

Jan. 22, 1993 [DE] Germany .................. 43 01 712.6

[51] Int. Cl.$^6$ ............................................. F25J 3/00
[52] U.S. Cl. ............... 62/36; 196/100; 202/158; 261/97
[58] Field of Search ............ 62/36, 42; 202/158; 196/100; 261/97

[56] References Cited

U.S. PATENT DOCUMENTS

| | | | |
|---|---|---|---|
| 3,315,896 | 4/1967 | Jacir | 261/97 |
| 3,392,967 | 7/1968 | Eckert | 261/97 |
| 4,444,696 | 4/1984 | Harper et al. | 261/97 |
| 4,648,972 | 3/1987 | Ullrich et al. | 261/97 |
| 4,776,989 | 10/1988 | Harper et al. | 202/158 |
| 4,909,967 | 3/1990 | Brinkley et al. | 261/97 |
| 5,132,055 | 7/1992 | Alleaume et al. | 261/97 |
| 5,224,351 | 7/1993 | Jeannot et al. | 62/36 |

FOREIGN PATENT DOCUMENTS 0434510  6/1991  European Pat. Off. .

OTHER PUBLICATIONS

Bomio et al., "Rektifikation und Absorption mit geordneten Packungen," *Chem. Tech.*, 43 Jg., Heft 11/12, Nov./Dec. 1991, pp. 409–415.

Latimer, "Distillation of Air," *Chemical Engineering Progress*, vol. 63, No. 2, Feb. 1967, pp. 35–59.

*Perry's Chemical Engineers' Handbook*, Sixth Edition, McGraw–Hill Book Company, New York, pp. 18–19 to 18–41.

*Primary Examiner*—Ronald C. Capossela
*Attorney, Agent, or Firm*—Millen, White, Zelano & Branigan

[57] ABSTRACT

An apparatus and process for cryogenic separation of air are described which utilize a pipe distributor or a channel distributor for liquid distribution. The air separation apparatus contains a rectifying column having at least one section equipped with packing materials, wherein a liquid distributor is positioned thereabove. The main channel and/or the distributing channels of the liquid distributor are closed over at least a portion of their top. Also described is a liquid distributor for use in a mass transfer column.

30 Claims, 6 Drawing Sheets

APPARATUS AND PROCESS FOR CRYOGENIC SEPARATION OF AIR AND LIQUID DISTRIBUTOR FOR A MASS TRANSFER COLUMN

BACKGROUND OF THE INVENTION

The invention relates to an apparatus and process for cryogenic separation of air which uses at least one rectifying column. The rectifying column comprises at least one section equipped with packing materials, and a liquid distributor positioned above this section. In addition, the invention relates to a liquid distributor suitable for use in a mass transfer column in which material is exchanged between a liquid phase and a vapor phase.

Air separation units are used to recover oxygen, nitrogen and/or noble gases from air. Their basic design and their mode of operation are known, for example, from the monograph "Tieftemperaturtechnik [Cryogenics]" by Hausen/Linde (2nd edition, 1985) or from an article by Latimer in Chemical Engineering Progress (Vol. 63, No. 2, 1967, page 35). For some years, packing materials, both nonstructured and structured, especially structured packings, have typically been used in rectifying columns of air separators. Nonstructured packings are dumped packings such as, for example, Rashig rings, Pall rings, Berl saddles, Intallox saddles and the like. Structured packings are arranged packings such as, for example, KochSulzer packings, Flexipac and the like. See also Perry's Chemical Engineer's Handbook, 6th edition, pp. 18–19 to 18–41 (1984). The effectiveness of the packing materials greatly depends on uniform wetting of their surface with reflux liquid. Therefore, there is placed, above a structured packing section, a liquid distributor to distribute the liquid flowing downward as homogeneously as possible over the column cross-section.

In many cases, air separation units are not run with constant throughput even in normal operation (in this regard, throughput refers to the volumetric flow rate of feed rate of air introduced into the air separator). This is especially the case when the resultant product is fed directly to another process that is not operated continuously or at a steady state, but, for example, is operated periodically. In other situations, the need exists to occasionally change the throughput of the air separator unit. The same problem of changes in the throughput occur especially when starting up each air separation unit.

If the air volume introduced into an air separator unit is reduced, for example, some time will pass until the steady equilibrium states corresponding to the new load are achieved at all points within the air separation column(s). As a result, in previously known air separation processes and units, brief load changes by changing column conversion, i.e., production amounts, are practically not possible.

Rectifying columns of air separators react extraordinarily sluggishly to such load variation, so that narrow limits are placed on the flexibility of oxygen and nitrogen production. Further, losses in yield and purity will result in cases of load variations.

With the recently introduced use of structured packings, instead of conventional exchange plates, certain improvements in start-up behavior and flexibility relative to load variations have been achieved because structured packings have a significantly smaller liquid holdup than plates. However, packed columns still have an unsatisfactorily high sluggishness in responding to load changes.

In the past, processes were developed for special applications that made it possible to vary production volumes with a constant loading of the rectifying columns. W. Rohde describes a special air separation process with variable storage adapted to handle very great fluctuations in "LINDE-Berichte aus Technik und Wissenschaft" (LINDE Reports on Technology and Science), Vol. 54 (1984), pp. 18–20. In this case, product oxygen is fed directly to a periodically operating oxygen-blowing process in the steel industry. The very high fluctuations in product volumes of the air separation system which occur in this example, over 40% of the maximum capacity of the air separator, are compensated for by buffer tanks, and the throughput through the rectifying columns can be kept essentially constant. However, such units with buffer tanks are very expensive in equipment and control engineering, especially with smaller fluctuations in product output of the system.

SUMMARY OF THE INVENTION

An object of the invention is to provide a process and apparatus of the type initially mentioned that have a high flexibility in operation. In particular, the process and apparatus can react relatively quickly to changes in throughput and/or have a short start-up phase, i.e., the time between the beginning of the start and the achievement of steady state operation is as short as possible.

Upon further study of the specification and appended claims, further objects and advantages of this invention will become apparent to those skilled in the art.

These objects are achieved by the use of a liquid distributor in which the main channel and/or the distributing channels thereof are closed at its top surface at least over a part of their cross-section. In other words, relative to its widest cross-section, the distributing channel and/or main channel is closed over at least a portion of its top.

Within the scope of the invention, it was discovered that a weak point with respect to quick load changes lies in the liquid distributors, placed in the column or columns above structured packing sections, which are intended to provide as uniform a distribution as possible of the reflux liquid over the column cross-section. In air separation columns that contain structured packings as material exchange elements, the quality of liquid distribution is of paramount importance. In packed air separation columns, channel distributors have previously been used which have outlets in the bottom wall and/or side walls of the channels and the channels have open tops. Such a liquid distributor for use in air separation is known, for example, from EP-A-0 434 510. See also, e.g., the trough distribution illustrated in FIG. 18–51 on page 18–31 of Perry's Chemical Engineer's Handbook, 6th edition.

A channel distributor works with a certain liquid level in the channels. The hydrostatic pressure associated with it regulates the amount of liquid that drips onto the subjacent structured packing section. The liquid level increases approximately quadratically with the liquid load (liquid volume per hour). Since the channels cover a large portion of the column cross-section, a channel distributor contains large amounts of liquid of a certain composition (concentration). This causes the high sluggishness of the distributor and thus the entire rectifying column in responding to quick load changes, as are often desirable in air separators. Since large liquid volumes at constant concentration must be changed, this period of sluggishness lasts for a long time, until the new steady state with its higher or lower liquid level in the distributor is achieved.

According to the invention, a pipe distributor or a modified channel distributor is used in the air separation column. Regarding pipe distributors, see, for example, the article by P. Bomio et al., Chem. Tech., 43.Jg., Heft [Number] 11/12, 1991. Pipe distributors generally comprise a vertical feed pipe, from which liquid is further conveyed to horizontally positioned distributing pipes. The distributing pipes cover a large part of the cross-section of the column and are closed on all sides. Only by openings on the underside of the distributing pipes can the liquid exit and drip onto the subjacent structured packing section. Such pipe distributors were previously provided only for certain purposes, especially processes having small liquid flow rates of up to 1 m$^3$/h. The use of such distributors in-air separation processes and liquid flow rates generally reached in such processes were not previously considered.

Based on expensive tests, it has turned out that within the scope of the invention that the drawbacks of a pipe distributor can be fewer than expected. Further, it was found that with modern production methods, pipe distributors can be produced that meet the strict requirements of distribution quality that exist for air separation, even for systems handling intermediate rather than small liquid loads. In particular, the outlets can be produced correspondingly precisely. A pipe distributor with high distribution quality can therefore also be used for distributing liquid in rectifying column(s) of industrial air separators which have intermediate liquid loads. Such liquid amounts are generally above 5 m$^3$/h, preferably above 15 m$^3$/h. Also, far higher liquid throughputs are achieved in large air separators, for example, 250 m$^3$/h and higher. The basic advantage of the pipe distributor lies in the fact that the hydrostatic pressure necessary for distribution is produced only by the liquid present in the vertical feed pipe. The liquid holdup of the distributor in stationary operation is therefore very small, i.e., about 25 to 50% that of a channel distributor of the same distributing quality.

The behavior of a pipe distributor during load changes is especially important. The liquid level changes only in the feed pipe, i.e., in a very small cross-section area (5% in comparison to a channel distributor). The change of the liquid holdup is therefore extraordinarily small also with relatively large load changes. The liquid holdup of the distributor is therefore adjusted within a very short time to a new steady state. As a result, quick load changes as well as short start-up times are possible without adversely affecting product concentration and yields. In the new air separator, for example, changes in load of 10–25 seconds per percent of load change can be performed, e.g., 50% load change in about 10–20 minutes. (As a measurement for the load change, for example, the reduction or the increase of the amount of the feed fluid fed to the rectifying column is used; of course, product amounts and other conversions also change correspondingly.)

Additional advantages result from the smaller total weight of the liquid distributor used according to the invention in comparison to a conventional channel distributor. On the one hand, for example, the use of a pipe distributor instead of a conventional channel distributor represents a weight savings of about 50% in the distributor design. The distributor is thus lighter and more precisely adjustable; a relatively inexpensive levelling device can be used. On the other hand, the reduction in the total weight, i.e., the sum of the distributor weight and the weight of its liquid holdup, is even greater. As a result, extraordinarily economical fastening devices can be used.

According to a variant of the invention, a modified channel distributor with low liquid holdup can also be used as the liquid distributor above the packed section of the rectifying column. In the modified channel distributor, the distributor channels, which are open on top, and/or the distributor main channel have an upwardly tapered cross-section. Due to the tapering upward, at least a portion of the top of the distributing channels and/or main channel is closed relative to its widest cross-section. If the modified channel distributor has distributing channels which have the same height and the same width at their lower edge as conventional channel distributors, then the modified channel distributor will achieve the same capacity (i.e., same maximum throughput) and distributing accuracy. However, the volume of liquid present, i.e., the liquid holdup, is clearly smaller with the same level: the volume drops linearly with the tapering upward. In this case, different cross-section shapes are conceivable, for example, a combination of rectangles of different widths or an equilateral triangle cut off above, standing on the base side.

The air separation unit according to the invention can comprise a rectifying column designed as a double column unit with a high-pressure column and a low-pressure column, at least one feed line for air, and product lines for nitrogen and oxygen. The low-pressure column, in which the use of structured packings is especially advantageous, can contain a pipe distributor or a modified channel distributor with low liquid holdup.

The air separator can further be equipped with a crude argon column connected with the low-pressure column of a double column unit. If packing materials are used in the crude argon column, it is advantageous to design the liquid distributor(s) as pipe distributor(s) or as modified channel distributor(s) with low liquid holdup. In particular, the high distributing quality of a pipe distributor has an advantageous effect on the efficiency of the oxygen-argon separation.

In a process for air separation by cryogenic rectification, using an apparatus in accordance with the invention, purified and cooled air is conveyed to a distilling system comprising at least one rectifying column and is rectified therein by countercurrent material exchange between a vapor phase and a liquid phase. The material exchange is performed in at least a portion of the at least one rectifying column via packing materials contained therein. The process according to the invention is characterized in that, above this portion containing packing materials, the liquid phase is guided by distributing channels that are closed on top over at least a part of 10 their cross-section. This type of liquid distribution can be used, for example, in a low-pressure column of a two-stage process or in a crude argon column.

In a first aspect of the invention, the basic suitability of a pipe distributor for distributing rectifying liquid in an air separator column has been shown. However, problems with the use of the known design of pipe distributors emerge in situations involving relatively high column diameters. The cross-section of the distributing pipes must increase as the inside diameter of the column increases to keep the pressure gradient along the distributing pipe and the horizontal flow rate within desired limits. As a result, the open cross-section area which remains between the distributing pipes, through which rising gas flows, becomes increasingly smaller and the loss of gas flow pressure increases.

To solve this problem, a new pipe distributor was developed within the scope of the invention. This new pipe distributor can be used not only in air separator columns, but also in other mass transfer columns.

The pipe distributor according to this aspect of the invention comprises at least one essentially horizontal main pipe and a plurality of also essentially horizontal distributing pipes. "Essentially horizontal" is intended to mean that the distributing pipes and main pipe do not deviate from the horizontal in a manner that would adversely affect the desired distribution quality of the distribution. The distributing pipes, which are provided with openings are connected with the main pipe and in fluid communication therewith. The distributing pipes have a maximum dimension b in a horizontal direction perpendicular to the distributing pipe axis, and the distributing pipes have a cross-sectional area which is greater than the area of a circle with diameter b.

This pipe distributor can be adapted practically to every column cross-section by varying the height of the distributing pipe, while its width remains the same. The adaptation thus exerts no influence on the gas flow, in particular its pressure loss is not increased. Also, the increase of the liquid holdup, with constant pipe width, is of no consequence, since this liquid holdup remains constant with changed liquid load, as long as the liquid level in the feed pipe lies above the upper edge of the distributing pipes. The advantage of great flexibility with load changes remains.

According to another aspect of the invention, the distributing pipes of the pipe distributor can have an essentially rectangular cross-section. As a result, commercially available rectangular profiles can be used for the production of the distributor. The latter are essentially simpler to deal with than pipes having, for example, a round or oval cross-section. In particular, the openings for output of the liquid can be oriented very exactly without great expense. Altogether, especially economical production is possible. The height of the rectangle can, for example, be greater than the width, also, a square shape of the cross-section can be used.

In the previously mentioned pipe distributors, distributing pipes are connected on both side walls of the main pipe via recesses in the main pipe. The recesses have the same cross-sectional shape as that of the distributing pipes. As a result, the lower edge of the distributing pipes is higher than the lower edge of the main pipe. Thus, no liquid is discharged from the distributor in the area beneath the main pipe. Depending on the width of the main pipe, the homogeneity of the liquid distribution can be considerably disturbed.

It has proven advantageous within the scope of the invention to provide the main pipe with recesses on its underside, in which the distributing pipes are inserted. The distributing pipes, on their part, have openings on their upper side in the area of the recesses of the main pipe, which provide flow connections between main pipe and distributing pipes. In this case, the distributing pipes can extend continuously over essentially the overall column diameter and do not need to be interrupted at the main pipe. As a result, a very high distribution quality is produced, including the area below the main pipe.

In addition, it is possible with relatively low production expense to connect the distributing pipes with the main pipe and to orient it exactly horizontally. For example, with rectangular distributing pipes, the recesses can be produced by a disk milling cutter. The distributing pipes can be brought into their horizontal position only by insertion with exact fit into these recesses, assuring an exactly vertical orientation of the openings for the liquid output.

The modified channel distributor according to the invention is not limited to use in air separation units, but can also be used in mass transfer columns for other processes. The modified channel distributor comprises at least one essentially horizontal main channel and a plurality of distributing channels which are open on top, flow-connected with the main channel, and provided with openings. The modified channel distributor is characterized by the distributing channels having a cross-section that tapers upwardly.

By the reduction in cross-section in the upper part of the distributing channels, the liquid holdup during steady operation is reduced compared to a conventional channel distributor. But, there is an even greater effect on the changes in liquid holdup that occurs with changes in liquid load during operation. If, for example, the width of the distributing channel at the height of the liquid surface is only a third of the base width of the channel, the change in liquid holdup with a load change is reduced by the factor 3 compared to a conventional channel distributor with rectangular cross-section.

The use of a pipe distributor or a modified channel distributor, as it is proposed according to the invention, is in principle not limited to air separation. The advantageous effect of favorable load variation behavior can basically also be achieved in other rectifying processes, especially if average liquid loads occur in a packed column. This applies especially for processes having similar strict requirements of distribution quality as in air separation.

The invention can be used advantageously in all types of air separation processes and units, in single-column or double-column processes, as well as in processes utilizing a subsequent crude argon column. One or more pipe-liquid distributors can be used in the high-pressure column, low-pressure column and/or crude argon column and/or in other columns connected to the air separator. Embodiments of air separation processes and units using structured packings as described in, e.g., German Patent Application P 42 24 068.9.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following, unless otherwise indicated, all parts and percentages are by weight.

The entire disclosure of all applications, patents and publications, cited above and below, and of corresponding German application P 43 01 712.6, are hereby incorporated by reference.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
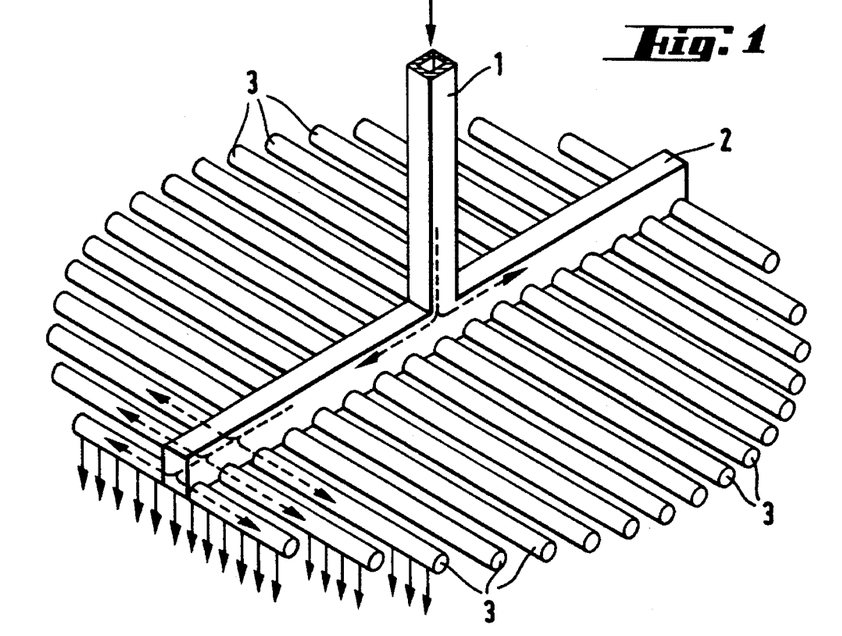
FIG. 1 illustrates a diagrammatic design of a pipeliquid distributor.

The basic design of a pipe distributor is represented in FIG. 1. The reflux liquid is conveyed by suitable means to feed pipe 1, which is oriented essentially vertically. From the feed pipe 1, the liquid flows to a plurality of distributing pipes 3. In the case of the distributor type represented in FIG. 1, liquid flow from the feed pipe 1 to distributing pipes 3 occurs via a main pipe 2. Distributing pipes 3 have openings on their underside, through which liquid can exit downwardly. Generally, the number of distributing pipes is 5 to 25, preferably 10 to 20 distributing pipes, per meter of main pipe length. They cover a considerable part (for example, 15 to 80%, preferably 30 to 60%) of the cross-sectional area of the rectifying column.

Distributing pipes 3 of the pipe distributor represented in FIG. 1 have a circular cross-section. However, other cross-sections are also possible, as is further explained below.

Figure 2:
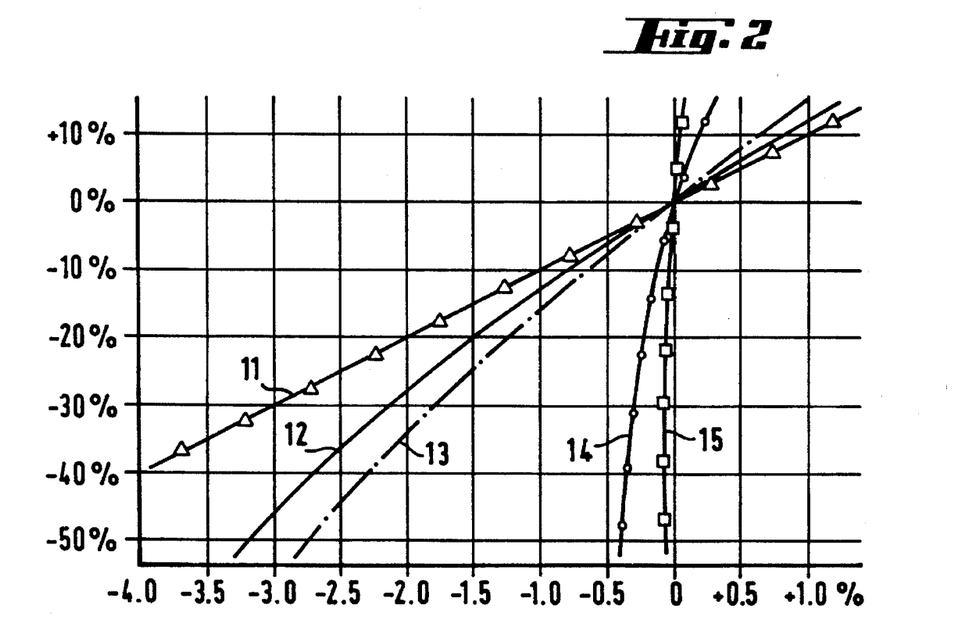
FIG. 2 is a graphical representation of the behavior of differently equipped rectifying columns with respect to the liquid holdup during load changes.

The diagram of FIG. 2 shows the percent change in liquid holdup (vertical axis) of a structured packing column as a function of the percent change in liquid load (horizontal axis). The change in load is related to the column volume ($m^3$ per $m^3$ column volume). The flat curves show a strong dependence of the liquid holdup on the liquid load and thus a sluggish load variation behavior. In the diagram, the percentage in load change from the basic load level (zero point) is indicated on the abscissa. The curves relate to rectifying columns containing the following components:

Curve 11 sieve plate

Curve 12 conventional channel distributor with structured packing

Curve 13 conventional channel distributor by itself (without structured packing)

Curve 14 pipe distributor with structured packing

Curve 15 pipe distributor by itself (without structured packing).

The packing used for the curves is a structured packing. Curves 13 and 15 are obtained by subtracting the values of packing holdup from the values of total holdup of the column.

Figure 6:
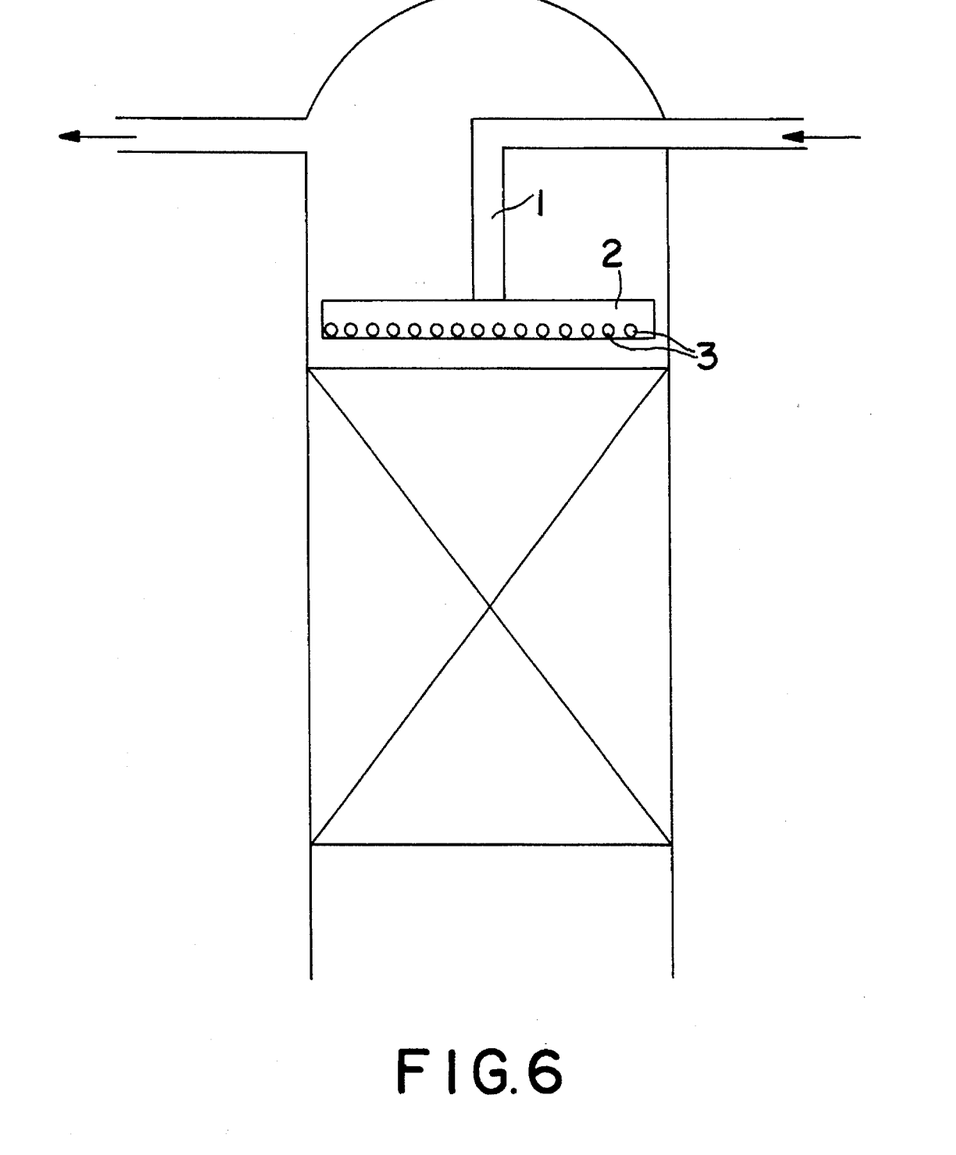
FIG. 6 illustrates a column in which a liquid distributor is positioned above a bed of packing material.

A rectifying column equipped with a structured packing, such as shown in FIG. 6, should exhibit a clearly improved load variation behavior compared to a sieve plate column because of the relatively small liquid holdup of the structured packing. However, this is not the case. Measurements and calculations performed show that, if conventional channel distributors are used in a rectifying column, with or without structured packing, the load variation behavior does not differ significantly from that of a sieve plate column. Compare curves 12 and 13 to curve 11. The liquid holdup of a pipe distributor is, in contrast, almost independent of the temporary load (curve 15). Also, if the liquid holdup of the pipe distributor and structured packing are combined, very advantageous load variation behavior is produced (curve 14).

Figure 3:
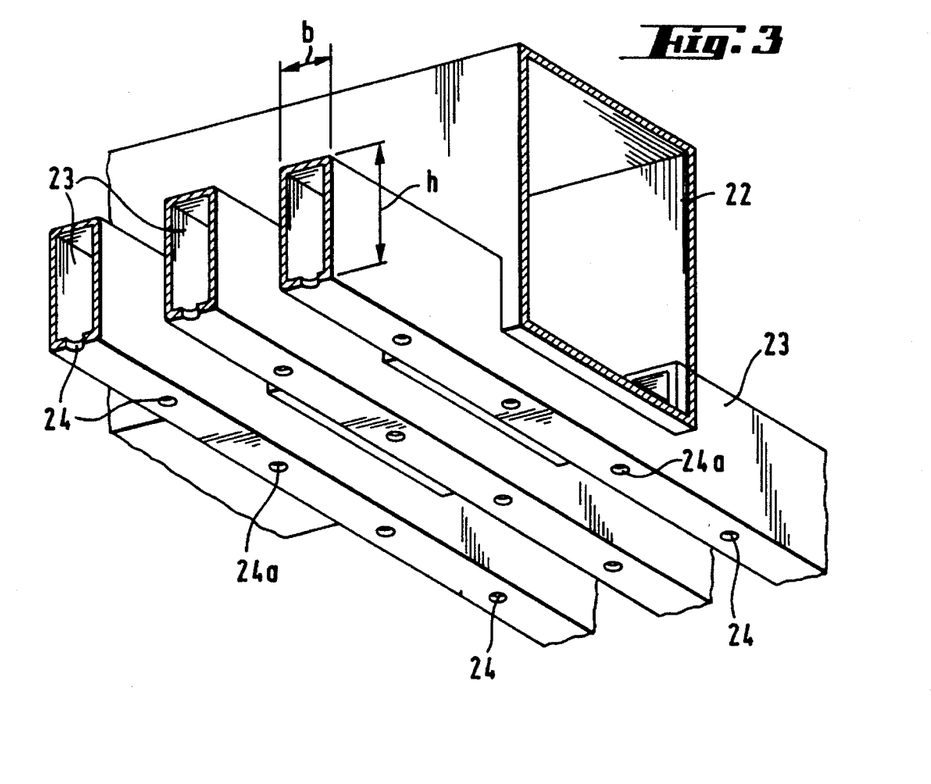
FIG. 3 illustrates an embodiment of a pipe distributor according to the invention in diagrammatically perspective representation.
Figure 4:
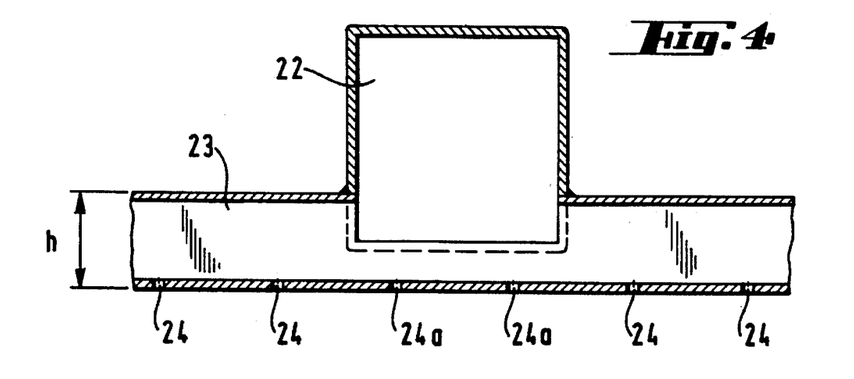
FIG. 4 shows a section through the pipe distributor of FIG. 3 in a vertical plane.
Figure 7:
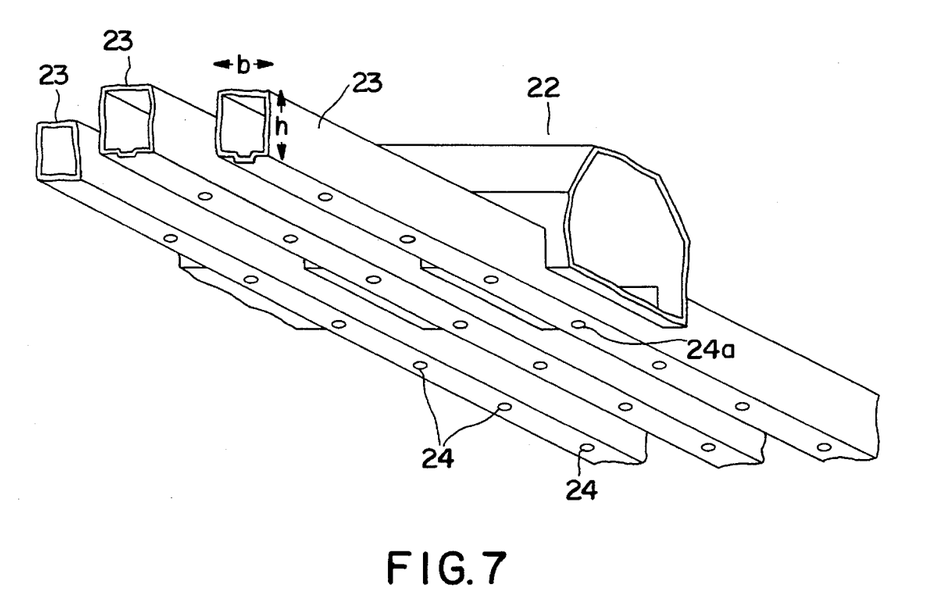
FIG. 7 shows an embodiment of a liquid distributor in which the main channel is tapered.

Sections of new pipe distributor developed within the scope of the invention are represented in FIGS. 3 and 4. Generally, this pipe distributor comprises a feed pipe (not shown) such as that of the conventional pipe distributor of FIG. 1, main pipe 22, and distributing pipes 23 which have openings 24 on their underside for liquid output. FIG. 7 shows a distributor similar to that of FIG. 3, except that the main channel 22 is upwardly tapered.

However, the cross-section of distributing pipes 23 deviates from the previously known circular shape in that height h is greater than the width b. In the case of non-rectangular cross-sections, the vertical dimension perpendicular to the axis of distributing pipe 23 is greater than the horizontal dimension perpendicular to the axis of distributing pipe 23. The ratio h/b preferably satisfies the relationship $1 < h/b \leq 10$, preferably $1 < h/b \leq 3$. In this manner, the cross-sectional area perpendicular to the flow direction is greater than in a distributing pipe with a circular cross-section and the same width (diameter b). It is also possible for the h/b ratio to be 1, so long as the cross-sectional area is greater than the cross-sectional area of a circular pipe of diameter b, e.g., a pipe having a square cross-section.

Figure 8:
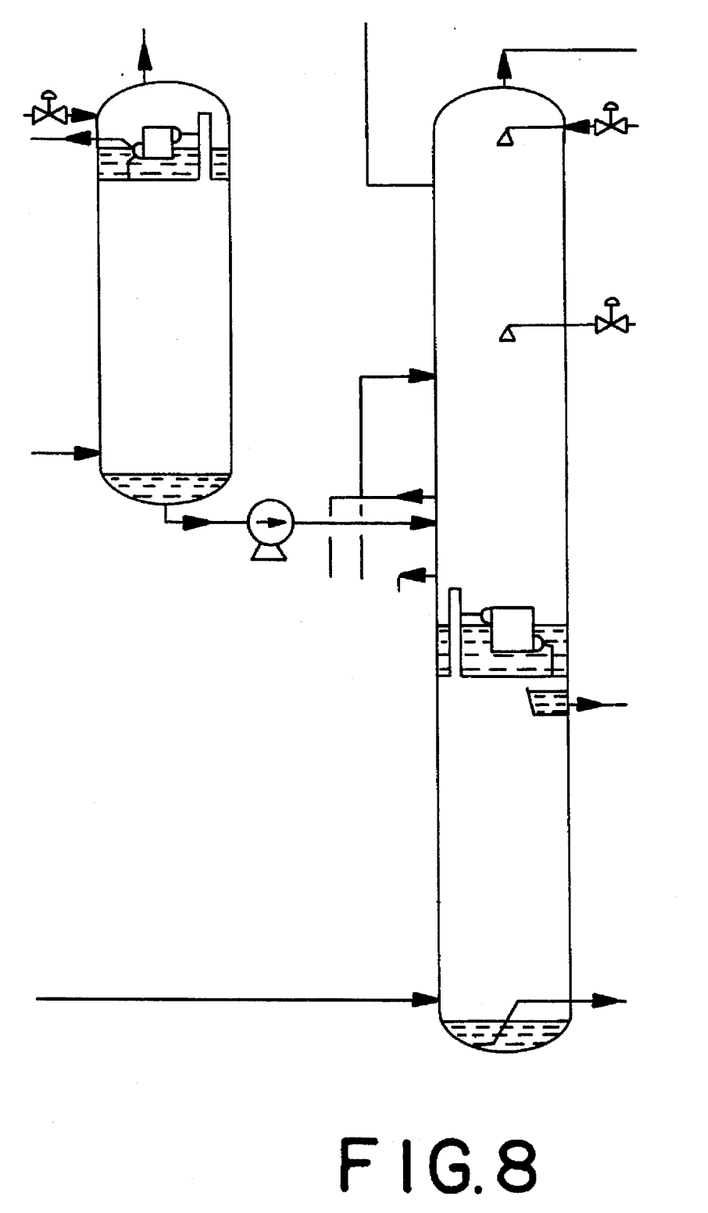
FIG. 8 shows a double column air separation system with argon recovery.

Distributing pipe width b can be, for example, about 15–100 mm, preferably 20–60 mm. Basically, rectifying columns with any size diameter can be equipped with the pipe distributor according to the invention. For example, providing columns having diameters of 1–6 m with the pipe distributor is possible. Even rectifying columns with still greater cross-sections, for example, diameters of 7 to 8 m, can be equipped with pipe distributors in accordance with the invention. With a wide column diameter, the maximum allowable flow rate can be maintained in pipes 23 by making a corresponding enlargement of height h. In industrial air separation, usually distributing pipes having a width b of about 40 mm are suitable for use in, for example, the low-pressure column of a two-stage process or 10 in a crude argon column. See FIG. 8.

Use of rectangular shaped distributing pipes 23, can permit an especially advantageous connection to the main pipe. Distributing pipes 23 are not inserted as opposing pairs into the side walls of main pipe 22. Instead, distributing pipes 23 pass through the underside of main pipe 22. In addition to providing economical production, the distributing quality is improved in this embodiment in comparison to conventional pipe distributors because outlets 24a are positioned below main pipe 22.

Figure 5A:
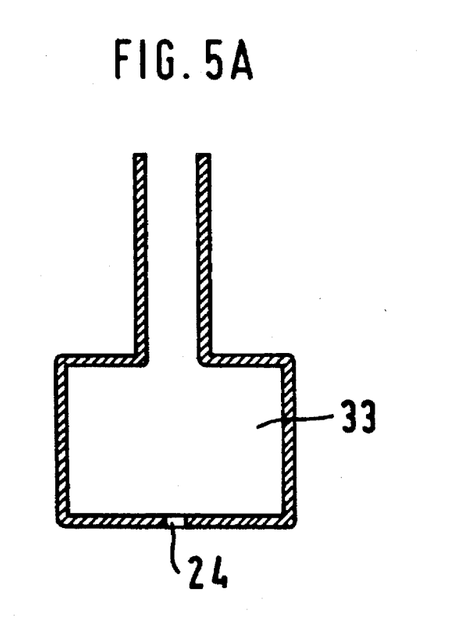
FIG. 5 depicts different examples for the cross-sectional shape of distributing pipes and/or main pipes.
Figure 5B:
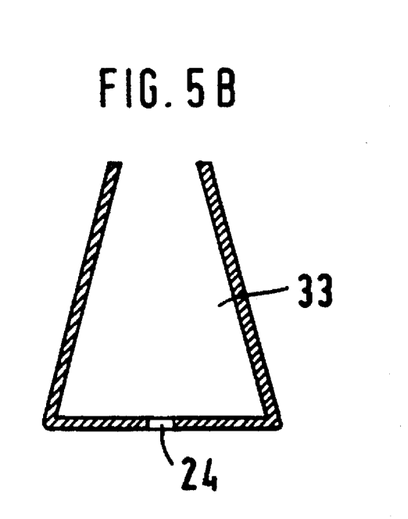

FIG. 5 illustrates other cross-sectional shapes for distributing channels 33 of a channel distributor according to the invention, which deviate from the above-mentioned rectangular shape. In these embodiments, the basic design of the channel distributor can be selected similar to the conventional shape (see, for example, already cited article of P. Bomio et al., Chem. Tech., 43.Jg., Number 11/12, 1991).

The preceding can be repeated with similar success by substituting the generically or specifically described reactants and/or operating conditions of this invention for those used therein.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an apparatus for cryogenic separation of air comprising at least one rectifying column, said column comprising at least one section equipped with packing materials and, positioned above said at least one section, a liquid distributor, said distributor comprising at least one main channel and a plurality of distributing channels connected to said main channel and in fluid communication therewith, said distributing channels having a plurality of openings therein to permit liquid discharge, the improvement wherein said main channel, said distributing channels, or both said main channel and said distributing channels, are closed over at least a portion of their top.

2. An apparatus according to claim 1, wherein said packing materials are nonstructured packings.

3. An apparatus according to claim 1, wherein said packing materials are structured packings.

4. An apparatus according to claim 1, wherein said liquid distributor is a pipe distributor.

5. An apparatus according to claim 4, wherein said at least one rectifying column is a double column having a high-pressure column and a low-pressure column and said column further comprises at least one air feed line, at least one nitrogen product line, and at least one oxygen product line.

6. An apparatus according to claim 5, wherein said low-pressure column comprises at least one section equipped with packing materials and said liquid distributor is positioned thereabove.

7. An apparatus according to claim 4, wherein said at least one rectifying column is a crude argon column which comprises a feed line for introduction of an argon-containing oxygen fraction and a product line for removal of crude argon.

8. An apparatus according to claim 1, wherein said liquid distributor is a channel distributor wherein each of said distributing channels is open over at least a portion of their top.

9. An apparatus according to claim 8, wherein said at least one rectifying column is a double column having a high-pressure column and a low-pressure column and said column further comprises at least one air feed line, at least one nitrogen product line, and at least one oxygen product line.

10. An apparatus according to claim 9, wherein said low-pressure column comprises at least one section equipped with packing materials and said liquid distributor is positioned thereabove.

11. An apparatus according to claim 8, wherein said at least one rectifying column is a crude argon column which comprises a feed line for introduction of an argon-containing oxygen fraction and a product line for removal of crude argon.

12. An apparatus according to claim 8, wherein each of said distributing channels has an upwardly tapered cross-section, whereby at least a portion of the top of each of said distributing channels is closed with respect to its widest cross-section.

13. An apparatus according to claim 8, wherein said main channel, said distributing channels, or both said main channel and said distributing channels, have an upwardly tapered cross-section.

14. An apparatus according to claim 1, wherein said at least one rectifying column is a double column having a high-pressure column and a low-pressure column and said column further comprises at least one air feed line, at least one nitrogen product line, and at least one oxygen product line.

15. An apparatus according to claim 1, wherein said at least one rectifying column is a crude argon column which comprises a feed line for introduction of an argon-containing oxygen fraction and a product line for removal of crude argon.

16. An apparatus according to claim 1, wherein said main channel is essentially horizontal and each of said distributing channels has a maximum width b in the horizontal direction perpendicular to their axis, wherein each of said distributing channels has a cross-section whose area is greater than the area of a circle with diameter b.

17. A liquid distributor according to claim 16, wherein said distributing pipes have an essentially rectangular cross-section.

18. An apparatus according to claim 16, wherein each of said distributing channels has a height h in the vertical direction and the ratio h/b satisfies the relationship $1 < h/b \leq 10$.

19. An apparatus according to claim 16, wherein width b is 15–100 mm.

20. An apparatus according to claim 1, wherein said plurality of openings in said distributing channels are positioned below said main channel.

21. In a process for air separation by cryogenic rectification comprising conveying purified and cooled air to a distilling system comprising at least one rectifying column, rectifying said air in said at least one rectifying column by countercurrent-material exchange between a vapor phase and a liquid phase, wherein said material exchange is conducted in at least one region of said at least one rectifying column which contains packing materials, the improvement wherein said liquid phase is distributed above said at least one region by a liquid distributor comprising at least one main channel and a plurality of distributing channels connected to said main channel and in fluid communication therewith, wherein said main channel, said distributing channels, or both said main channel and said distributing channels, are closed over at least a portion of their top.

22. A process according to claim 21, wherein the flow rate of said liquid phase is greater than 5 m³/h.

23. A process according to claim 21, wherein the flow rate of said liquid phase is greater than 15 m³/h.

24. A process according to claim 21, wherein the flow rate of said liquid phase is greater than 250 m³/h.

25. A process according to claim 21, wherein each of said distributing channels has an upwardly tapered cross-section, whereby at least a portion of the top of each of said distributing channels is closed with respect to its widest cross-section, whereby liquid hold-up within said distributing channels is reduced compared to the liquid hold-up in a channel distributor without upwardly tapering distributing channels.

26. A liquid distributor for a mass transfer column, said distributor comprising:

at least one essentially horizontal main pipe and a plurality of distributing pipes connected to said main pipe and in fluid communication therewith, each of said distributing pipes having a plurality of openings therein to permit liquid discharge, and each of said distributing pipes having a maximum width b in the horizontal direction perpendicular to the distributing pipe axis, wherein each of said distributing pipes has a cross-section whose area is greater than the area of a circle with diameter b, wherein said main pipe has on its underside recesses into which said distributing pipes are inserted, and each of said distributing pipes has an opening on their upper side at the point of connection with said recesses of said main pipe, whereby said recesses and said openings on the upper side of each distributing pipe provide fluid communication between said main pipe and said distributing pipes.

27. An apparatus according to claim 26, wherein each of said distributing channels has a height h in the vertical direction and the ratio h/b satisfies the relationship $1 < h/b \leq 10$.

28. An apparatus according to claim 26, wherein said plurality of openings in said distributing channels are positioned below said main channel.

29. A liquid distributor for a mass transfer column, said distributor comprising:

at least one essentially horizontal main channel and a plurality of distributing channels open on top, each of said distributing channels is in fluid communication with said main channel and is provided with a plurality of openings for liquid discharge, wherein each of said distributing channels has an upwardly tapered cross-section, whereby at least a portion of the top of each of said distributing channels is closed with respect to its widest cross-section.

30. A liquid distributor for a mass transfer column, said distributor comprising:

at least one essentially horizontal main channel and a plurality of distributing channels open on top, each of said distributing channels is in fluid communication with said main channel and is provided with a plurality of openings for liquid discharge, wherein each of said distributing channels has an upwardly tapered cross-section, whereby at least a portion of the top of each of said distributing channels is closed with respect to its widest cross-section, and wherein said main channel has a longitudinal axis and each distributing channel has a longitudinal axis which intersects the vertical plane containing the longitudinal axis of said main channel.

* * * * *